US006600817B1

(12) United States Patent
Shaffer et al.

(10) Patent No.: US 6,600,817 B1
(45) Date of Patent: Jul. 29, 2003

(54) METHOD AND APPARATUS FOR MONITORING COMMUNICATION CONNECTIONS WITHIN AND ACROSS TIME ZONES

(75) Inventors: Shmuel Shaffer, Palo Alto, CA (US); William J. Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/378,242

(22) Filed: Aug. 19, 1999

(51) Int. Cl.[7] ................................................ H04M 1/66
(52) U.S. Cl. .............. 379/199; 379/207.03; 379/201.02
(58) Field of Search ................................ 379/188, 197, 379/198, 199, 196, 201.02, 207.03

(56) References Cited

U.S. PATENT DOCUMENTS

| 4,266,098 A | * | 5/1981 | Novak |
| 5,109,405 A | * | 4/1992 | Morganstein .......... 379/142.07 |
| 5,818,920 A | * | 10/1998 | Rignell |

FOREIGN PATENT DOCUMENTS

| EP | 531 048 A2 | 8/1992 | |
| GB | 2 284 965 | 6/1995 | ............ H04M/3/32 |

\* cited by examiner

Primary Examiner—Ahmad F. Matar
Assistant Examiner—Rasha S AL-Aubaidi

(57) ABSTRACT

A method and a system monitor communication connections from a calling communication terminal to a target communication terminal during predetermined time periods, so as to prevent calls placed at undesirable times from being automatically connected to the target communication terminal. The method includes selecting predetermined time periods, preferably utilizing a web-based interface, in which the system monitors the incoming calls to selectively connect the target communication terminal with the calling communication terminal and further includes determining the types of calls which the system will monitor. Preferably, the system is set to monitor all incoming calls during the predetermined time period, regardless of the calls' originating time zones, utilizing a TOL application. When the system is set for monitoring incoming calls exclusively within the same time zone as the target communication terminal or monitoring incoming calls exclusively outside the target communication terminal, the system cross-checks the caller identification information against area codes and country codes contained in a local database. In response to detecting an incoming call that is received within one of the predetermined time periods and that is set to be monitored, the system will (i) play a message informing the caller of the local time of the target communication terminal; (ii) play an announcement indicating that the call is being made within a predetermined time period in which calls are being monitored; and (iii) offer the caller the option of abandoning the call before it is connected. If the caller takes the option of abandoning the call, then the call is disconnected. Alternatively, if the caller does not take the option of abandoning the call, the call is connected to the target communication terminal.

16 Claims, 2 Drawing Sheets

METHOD AND APPARATUS FOR MONITORING COMMUNICATION CONNECTIONS WITHIN AND ACROSS TIME ZONES

BACKGROUND OF THE INVENTION

The invention relates to telecommunication systems and, in particular, to telecommunications systems in which calls are monitored and processed based on the time zone at the calling communication terminal.

DESCRIPTION OF THE RELATED ART

Placing calls within and across time zones can cause inconveniences for the called party. For example, when the caller calls from a communication terminal, such as a desktop telephone, located in one time zone to a target communication terminal located in another time zone, the caller may be unaware of the local time of the target communication terminal. The caller may unknowingly place a call to a target communication terminal at an odd hour (e.g. 1:00 a.m.), because the caller mistakenly calculated the time difference between the originating communication terminal and the target communication terminal or because the caller was unaware of the time difference. Furthermore, a called party may be inconvenienced even if a caller calls within the same time zone as the called party, because the called party does not want to be disturbed at that time.

To overcome problems relating to the time zone differences between calling parties and called parties, several approaches have been suggested. One prior approach to handling unwanted calls based on the time zone differences between the calling party and called party is suggested by UK Patent Application GB 2 284 965 by Seppo (Seppo). Seppo discloses a system for automatically providing a calling party with the time of day within the geographical area of the called party. The calling telephone is configured to extract the prefix of each telephone number dialed by a caller and to use the extracted prefix to determine the time difference between the geographical areas of the two telephones. The local time at the called telephone is then indicated on a display at the calling telephone. Thus, each telephone must have sufficient memory to store data which enables the telephone to recognize the various prefixes. The memory must be periodically updated to reflect area code changes and additions. Moreover, Seppo does not disclose any means for preventing a call placed at an undesirable time from being connected. Therefore, if the calling party misreads the display or does not pay attention to the display, the call may still be connected even if it is made at an undesirable time for the called party.

Another approach to overcome the time zone difference problem has been to place the telephone "off-hook." However, such a solution would inconvenience the called party in other ways, such as not receiving any outside calls, including emergency and urgent calls. Further, when the telephone is placed off-hook, it may generate an annoying alert signal, usually followed by a recorded announcement.

U.S. Pat. No. 5,818,920 to Rignell et al. (Rignell) discloses a system for preventing calls placed at undesirable times from being connected when the calling party and the called party are located in different time zones. In particular, Rignell describes a communications system in which calls can be forwarded from a target terminal to a new terminal. The call-forwarding system includes a prevention device to selectively prevent communication connections to either a target or new terminal when the calling communication terminal and the target or new communication terminal are located in different time zones. The prevention means can inform the calling terminal of the local time of the target or new communication terminal and allow the connection to be established only after receiving verification from the calling communication terminal, or can simply prohibit the connection from occurring during certain time periods. Even though Rignell allows emergency and urgent calls to be completed by establishing a forwarding connection only after receiving verification from the calling party when the calling party is calling from a different time zone, Rignell does not disclose any means for preventing a call placed at an undesirable time from being automatically connected when the calling party and the called party are located within the same time zone. That is, if the called party does not want to be disturbed during certain time periods, even if the call is made at a "normal" hour (e.g. 1:00 p.m.), by a calling party located within the same time zone as the called party, the call will automatically be connected. Moreover, by simply prohibiting the call during certain time periods, the call-forwarding system of Rignell does not allow an emergency or urgent call to be connected.

What is needed is a method and a system that provide time-dependent monitoring of communication connections to a target communication terminal when a call is initiated within the same time zone or in a different time zone as the target communication terminal, so that the incoming call will not automatically be connected to the target communication terminal.

SUMMARY OF THE INVENTION

A method and a system are configured to monitor communication connections to a target communication terminal during predetermined time periods and to prevent calls placed during selected times from being automatically connected to the target communication terminal, whether the incoming call originated from within the same time zone or from a different time zone in which the target communication terminal resides. In the preferred embodiment, the communications are incoming telephone calls, but the method and system may be applied to any notification system, e.g. pager applications. Moreover, in the preferred embodiment, the monitoring by the telecommunication system is implemented in a telephony-over-local area network (LAN) or "TOL" application to allow the handling of telephone calls via any one of a number of networked computers.

In a first step, the user of a target communication terminal selects the predetermined time periods when the telecommunications system will monitor the communication connections to the target communication terminal. In a preferred embodiment, selecting the predetermined time periods to monitor the incoming calls is carried out by the user of the target communication terminal utilizing a web-based interface. In another embodiment, selecting the predetermined time periods to monitor the incoming calls is carried out by the user of the target communication terminal utilizing an audio menu on a voice response system.

The telecommunication system also maintains a database of area codes and country codes, enabling the system to determine whether a call is originating from within the same time zone as the target communication terminal or outside the time zone of the target communication terminal. To make the determination whether to monitor the call during the predetermined time period, a comparison is performed using the caller identification information, which is passed along the Public Switched Telephone Network (PSTN) to the target communication terminal, with the location data within the database. The database is accessed when the system is programmed to monitor exclusively incoming calls from the same time zone as the target communication terminal or to monitor exclusively incoming calls from a different time zone than the target communication terminal. When the system is programmed to monitor all incoming calls, regardless of the caller's originating time zone, there is not a need to access the database to determine the time zone from which the call is originating.

In a preferred embodiment, the TOL client detects an incoming call from a calling communication terminal and determines whether the call is within a predetermined time period which was previously configured by the user of the target communication terminal. If the incoming call is not within a predetermined time period, then the call will automatically be connected. However, if the timing of the call is within a predetermined time period in which all incoming calls are to be monitored, the TOL client will: (i) play a message informing the caller of the local time of the target communication terminal; (ii) play an announcement indicating that the call is being made within a predetermined time period in which all calls within the time zone and different time zone as the target communication terminal are being monitored; and (iii) offer the caller the option of abandoning the call before it is connected.

In order to minimize memory requirements, only the area codes and country codes for geographical locations having the same time as the target communication terminal need to be stored. Consequently, in an application in which the caller has called within a predetermined time period during which only calls within the same time zone as the target communication terminal are being monitored, then the TOL client must cross-check the database to determine whether the area code or country code that is extracted from the caller identification information matches an area code or country code within the database. When there is a match, the call is originating within the same time zone as the target communication terminal and the TOL client will carry out the aforementioned steps.

The method and the system enable a user of a target communication terminal to select an option of preventing calls from a particular calling communication terminal during a predetermined time period, regardless of the time zone in which the particular calling communication resides while at the same time allowing in emergency and urgent calls when need be. While the system is activated during the predetermined time periods, outgoing calls will be unaffected. At the end of the programmed time period, the target communication terminal will automatically be restored to normal operation.

DETAILED DESCRIPTION

Figure 1:
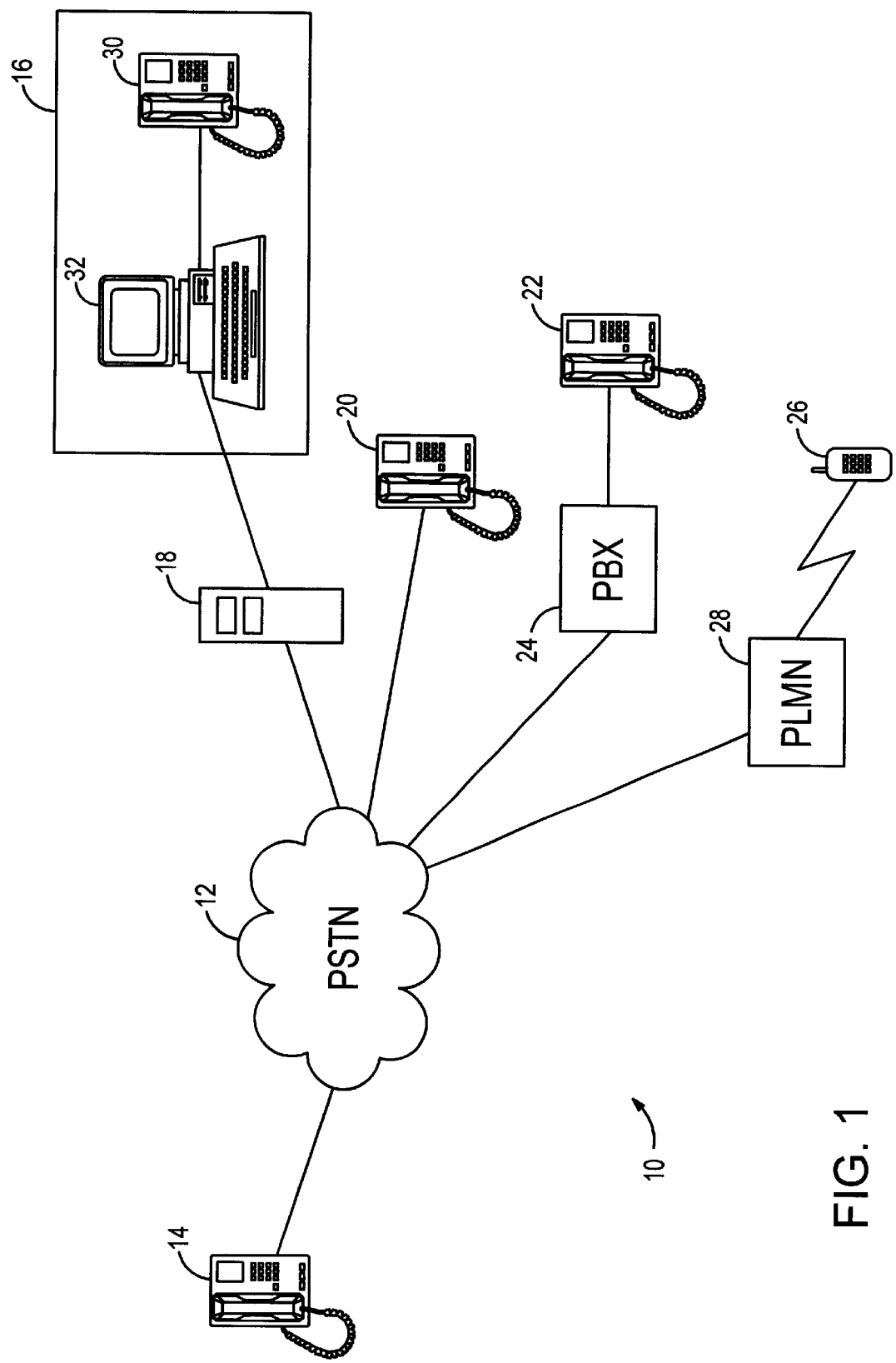
FIG. 1 is a schematic view of the telecommunication system according to the present invention.

With reference to FIG. 1, a communication system 10 for implementing several embodiments of the present invention is shown. In the preferred embodiment, the system comprises a PSTN 12 that supports connections between at least one calling communication terminal 14 and a target communication terminal 16 via a TOL server 18. The target communication terminal 16 is preferably a TOL client, which may include a computer 32 and a telephone 30. The calling communication terminal 14 can be a telephone, computer, cellular phone, or any other type of device which is used for communication. In another embodiment of the invention, the PSTN 12 connects the calling communication terminal 14 directly to the target communication terminal 20. Furthermore, the invention can be implemented via a Private Branch Exchange (PBX) 24 that supports a target communication terminal 22. Alternatively, the invention can be implemented via a Public Land Mobile Network (PLMN 28) that provides wireless connectivity for a target communication terminal 26. Even though FIG. 1 illustrates only one target communication terminal for each embodiment, it is well known in the art that more than one target communication terminal can be connected to the PSTN 12, the server 18, the PBX 24 and the PLMN 28. Moreover, it is well known that more than one calling communication terminal 14 can be connected to PSTN 12 at the calling end of a particular call.

The telephone 30 in target communication terminal 16 is not critical to the invention, since TOL capability may be achieved by using the resources of the computer 32 (e.g., sound cards and internal or external speakers and microphones). That is, the TOL client can be a telephone-enabled computer. Even the computer 32 in target communication terminal 16 is not critical to the invention, since the TOL client can be an IP phone. Preferably, the target communication terminal 16 is a telephony client that handles incoming and outgoing telephone calls via the telecommunications server 18. The telecommunications server 18 is shown as being connected to the PSTN 12, allowing it to perform the gateway function of converting between circuit switched (PSTN 12) and packet switched (TOL) voice. The PSTN 12 allows for caller identification information to be passed through to the target communication terminals 16, 20, 22 and 26 at the receiving end of the communication system.

Figure 2:
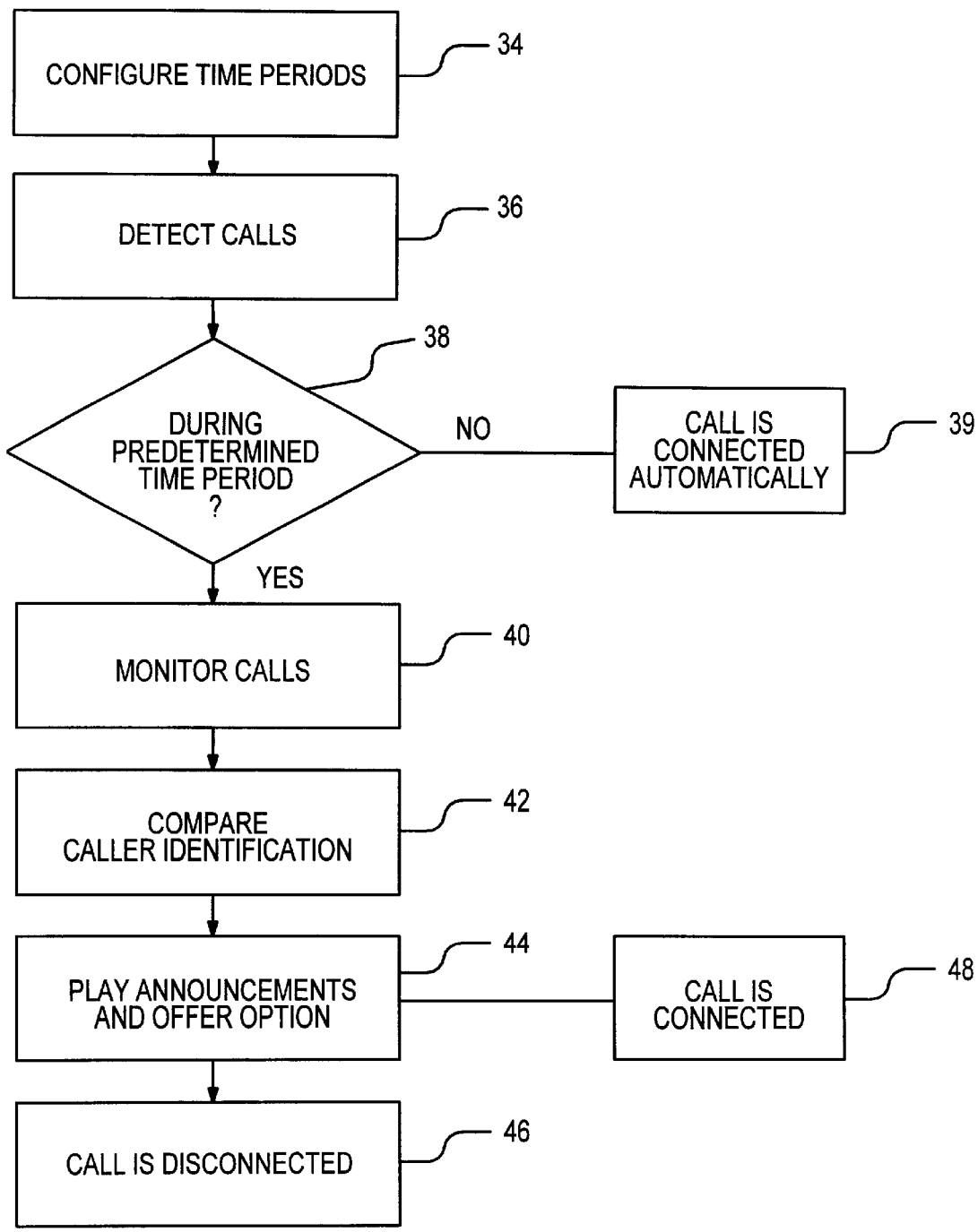
FIG. 2 is a flowchart of steps for implementing the processing communication connection system in accordance with the invention.

FIG. 2 illustrates a process flow for a method of monitoring communication connections utilizing the system of FIG. 1. In the preferred embodiment of the invention, in the first step 34, users of target communication terminal 16, utilizing a web-based interface, an audio menu on a voice response system, or any other data input means, can configure the time periods for different days during which incoming calls to the target communication terminal 16 are to be monitored via the computer 32 of the target communication terminal 16. Alternatively, a default time period may be selected during which incoming calls to the target communication terminal 16 are to be monitored. Furthermore, users select whether they want to monitor all incoming calls, (i.e., calls originated within the same time zone as the target communication terminal 16 or in a different time zone than the target communication terminal 16), or to monitor only calls originating in a different time zone than the target communication terminal 16, or to monitor only calls originating within the same time zone as the target communication terminal 16.

Then, in step 36, the computer 32 of the target communication terminal 16 detects an incoming call directed from the calling communication terminal 14 to the target communication terminal 16. After detecting the call, at step 38, the computer 32 of target communication terminal 16 determines whether the call from the calling communication terminal 14 occurs during a predetermined time period selected by the user of the target communication terminal 16. If the call does not occur during a predetermined time period, the call will automatically be connected to the target communication terminal 16, as indicated at step 39. However, if the call occurs during a user-selected predetermined time period, at step 40, the computer 32 of the target communication terminal 16 will monitor the call to selectively connect the call to the telephone 30. Alternatively, the selection may be made at the server 18.

If the user of the target communication terminal 16 selected the parameter of monitoring all calls during the predetermined time period, the computer 32 of target communication terminal 16 (or server 18) does not need to determine the time zone in which the calling communication terminal 14 resides. Therefore, the computer 32 of target communication terminal 16 will progress directly to step 44, as explained below.

Alternatively, if the user of target communication terminal 16 wanted exclusively to monitor calls originating from the same time zone as the target communication terminal 30 or to monitor exclusively calls originating from a time zone outside the target communication terminal's time zone, the computer 32 (or the server 18) must identify the time zone of the calling communication terminal 14. This can be accomplished by extracting the area code or country code from standard caller identification information of telecommunication systems. Thus, at step 42 the computer will compare the code data extracted from the caller identification information with area codes and country codes of a database maintained in memory within the target communication terminal 16. The target communication terminal 16 only needs to maintain a database of area codes and country codes that are within the target communication terminal's time zone, thereby reducing the amount of information needed to be stored and periodically updated. To determine whether an incoming call originated within the same time zone as a target communication terminal or a different time zone, the target communication terminal 16 simply needs to cross-check with the database to determine whether there is a match between the database information and the code data extracted from the caller identification information.

If the call fits both the time and location requirements selected by the user, then at step 44, the computer 32 of target communication terminal 16 will: (i) inform the caller at the calling terminal 14 of the local time of the target communication terminal 16; (ii) play an announcement to the caller indicating that the call is being made within the predetermined time period in which calls are being monitored; and (iii) offer the caller an option of abandoning the incoming call before the call is connected to the target communication terminal 16. If the caller takes the option of abandoning the call, then the call is disconnected at step 46. Alternatively, if the caller does not take the option of abandoning the call, then the call is connected to the target communication terminal 16 at step 48.

While the process flow of FIG. 2 has been described primarily with respect to a TOL client, this is not critical. The method may be implemented in other embodiments apart from a TOL client, such as in a central office system, PBX system, or PLMN system. Thus, the database of area and country codes may be maintained at the PSTN 12, the PBS 24 or the PLMN 28. Incoming calls are detected and processed to determine whether time and location requirements selected by called parties are satisfied, in order to determine whether the callers should be presented with the option of abandoning the incoming calls. That is, all of the steps shown in FIG. 2 may be executed at the central office of the PSTN, within the switching circuitry of the PBX, or within the switching circuitry of the PLMN. Moreover, all of the steps shown in FIG. 2 may be implemented at the calling terminal 14 instead of at the target communication terminal 16, thereby allowing the caller to initiate the monitoring process rather than having the target communication terminal monitor the incoming calls. The time and location requirements can be entered at the appropriate location using a web-based interface via the global communications network referred to as the Internet.

Moreover, if the individual telephones 20, 22 and 26 having sufficient processing capability, the steps of FIG. 2 can be executed internally. In this application, the connection step 48 is a connection to the ringer device of the telephone.

What is claimed is:

1. A method of monitoring communication connections to a target communication terminal during predetermined time periods, said method comprising steps of:

selecting said predetermined time periods;

maintaining target location data indicative of relationships between said target communication terminal and geographical locations, said target location data including identifications of at least one of area codes and country codes assigned to said target communication terminal on occasions in which said target communication terminal is in specific geographical locations, said target location data being maintained within said target communication terminal;

detecting a call from a calling communication terminal to said target communication terminal, said detecting occurring at said target communication terminal;

determining whether a caller of said calling communication terminal has called within said predetermined time periods;

determining whether said caller is calling within a same time zone or a different time zone as said target communication terminal, said step of determining including:

(1) using said target location data maintained within said target communication terminal, including using at least one of said area codes and said country codes assigned to said target communication terminal in said specific geographical locations;

(2) utilizing caller identification information received by said target communication terminal, including identifying at least one of an area code and a country code assigned to said calling communication terminal;

(3) comparing said target location data with said caller identification information; and offering said caller, whether said caller is calling within said same time zone or said different time zone as said target communication terminal, an option of abandoning said call if said call is detected within one of said predetermined time periods, including using resources of said target communication terminal to offer said option.

2. The method of claim 1 wherein said step of selecting said predetermined time periods includes selecting at least one first time period specific to calls determined to be from said same time zone and selecting a least one second time period that is specific to calls determined to be from outside said same time zone, each of said first and second time periods being limited to less than the total time in a day specified by said time period, said selecting of said at least one first time period being executed separately from selecting said at least one second time period.

3. The method of claim 1 wherein said step of selecting said predetermined time periods is carried out by said user utilizing an audio menu on a voice response system.

4. The method of claim 2 wherein said step of selecting said predetermined time periods is enabled to allow different configurations of said first and second time periods for different days.

5. The method of claim 1 wherein said step of selecting said predetermined time periods includes selecting a default time period.

6. The method of claim 1 wherein said step of maintaining said target location data includes storing said target location data as a database of area codes and country codes within memory of said target communication terminal.

7. The method of claim 6 wherein said caller identification information is passed through the Public Switched Telephone Network which supports said target communication terminal.

8. The method of claim 1 wherein said step of offering said caller said option of abandoning said call includes playing a message informing said caller of the local time of said target communication terminal, said step of offering being executed upon establishing connectivity to said target communication terminal but prior to ringing of said target communication terminal to alert a user of said call.

9. The method of claim 1 wherein said step of offering said caller said option of abandoning said call includes playing an announcement to said caller indicating that said call is being made within one of said predetermined time periods in which calls are being monitored, said step of offering being executed upon establishing connectivity to said target communication terminal but prior to ringing of said target communication terminal to alert a user of said call.

10. The method of claim 1 further comprising a step of enabling a user of said target communication terminal to select an option of preventing calls from a particular calling communication terminal during said predetermined time periods, said particular calling communication terminal being selectable regardless of a time zone in which said particular calling communication terminal resides.

11. A method of utilizing a web-based interface to configure predetermined time periods relevant to monitoring communication connections to a target telephony over LAN (TOL) terminal, comprising steps of:

linking to said web-based interface via said target TOL terminal;

selecting said predetermined time periods in which said user of said target TOL terminal wants to be undisturbed, said selecting being via said web-based interface;

accessing a caller identification when an incoming call to said target TOL terminal is registered;

determining, at said target TOL terminal, whether said incoming call is within one of said predetermined time periods;

determining, at said target TOL terminal, whether said incoming call is originated from within same time zone or different time zone as said target TOL terminal, including using caller identification information and comparing said caller identification information to a database of area codes and country codes that are within a time zone of said target TOL terminal; and offering a caller of said incoming call, whether said caller is calling within said same time zone or said different time zone as said target TOL terminal, options of abandoning or connecting said incoming call if said caller is calling said target TOL terminal within one of said predetermined time periods.

12. The method of claim 11 wherein said step of selecting said predetermined time periods includes selecting different times for different days.

13. The method of claim 11 wherein said the caller identification information is passed through the Public Switched Telephone Network of said user of target TOL terminal.

14. The method of claim 11 wherein said step of offering said caller said option of terminating said call includes playing a message informing said caller of the local time of said target TOL terminal.

15. The method of claim 14 wherein said step of offering said calling communication terminal said option of terminating said call includes playing an announcement to said calling communication terminal indicating that said call is being made within said predetermined time periods in which calls are being monitored.

16. A method of monitoring calls to a telephony over LAN (TOL) terminal comprising the steps of:

programming a target TOL terminal to identify unrestricted time periods in which incoming calls are to be received without pre-screening and to identify restricted time periods in which said incoming calls are to be screened, including at least two restricted time periods that are distinguishable with respect to geographic locations from which said incoming calls originate;

storing geography-specific telephone code information within said TOL terminal, said telephone code information being established by a telephony network and being specific to geographical regions, said telephone code information including data that is geography-specific to a time zone of said target TOL terminal;

establishing connections to said target TOL terminal when incoming calls are received, including enabling a ring-through connection during said unrestricted time periods but enabling call screening during said restricted time periods; and executing said call screening at said target TOL terminal for said incoming calls received during said restricted time periods, said call screening including:
(1) accessing said geography-specific telephone code information to confirm that said incoming calls are to be screened and enabling a ring-through connection for said incoming calls for which said confirmation is not provided;
(2) transmitting information to calling parties regarding options for continued handling of said incoming calls for which said confirmation is provided; and
(3) enabling a ring-through connection when said ring-through option is selected.

* * * * *